US012004216B2

(12) United States Patent
Seok et al.

(10) Patent No.: US 12,004,216 B2
(45) Date of Patent: Jun. 4, 2024

(54) APPARATUS AND METHODS FOR TB PPDU ALIGNMENT FOR MULTI-LINK TRIGGERED UPLINK ACCESS IN A WIRELESS NETWORK

(71) Applicant: MediaTek Singapore Pte. Ltd., Singapore (SG)

(72) Inventors: Yongho Seok, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/092,905

(22) Filed: Jan. 3, 2023

(65) Prior Publication Data
US 2023/0141728 A1 May 11, 2023

Related U.S. Application Data

(63) Continuation of application No. 17/082,762, filed on Oct. 28, 2020, now Pat. No. 11,576,208.
(Continued)

(51) Int. Cl.
*H04W 56/00* (2009.01)
*H04L 5/00* (2006.01)
*H04W 28/06* (2009.01)
*H04W 72/0446* (2023.01)
(Continued)

(52) U.S. Cl.
CPC ....... *H04W 74/0816* (2013.01); *H04L 5/0055* (2013.01); *H04W 28/06* (2013.01);
(Continued)

(58) Field of Classification Search
CPC ............ H04W 74/0816; H04W 28/06; H04W 72/0446; H04W 80/02; H04L 5/0055; H04B 7/0413
(Continued)

(56) References Cited

U.S. PATENT DOCUMENTS 6,477,368 B1 * 11/2002 Korneluk ............... H04W 99/00
455/425
11,265,927 B1 * 3/2022 Chu ..................... H04W 74/085
(Continued)

FOREIGN PATENT DOCUMENTS

| EP | 2329680 A1 | 6/2011 |
| GB | 2549967 A | 8/2017 |
| WO | 2006096864 A2 | 9/2006 |

OTHER PUBLICATIONS

Seok; et al. EHT Multi-link Operation. doc.: IEEE 802.11-19/073r0. May 15, 2019. 17 pp.

*Primary Examiner* — Sai Ming Chan

(57) ABSTRACT

Embodiments of the present invention prevent interference caused by the simultaneous transmission and reception of data in a constrained multi-link operation of a wireless network. According to one embodiment, a frame from a first affiliated AP of a multi-band wireless AP is transmitted for receipt by an STA, and a second affiliated wireless AP of the multi-band wireless AP is scheduled to transmit a trigger frame to the wireless STA over a second wireless link. Accordingly, the trigger frame is transmitted from the second affiliated wireless AP to the wireless STA over the second wireless link, and the response frame solicited by the frame is scheduled for transmission after the predetermined value has expired following an end of the PPDUs containing the trigger frame.

20 Claims, 11 Drawing Sheets

Related U.S. Application Data

(60) Provisional application No. 63/013,586, filed on Apr. 22, 2020, provisional application No. 63/001,602, filed on Mar. 30, 2020, provisional application No. 62/992,228, filed on Mar. 20, 2020, provisional application No. 62/968,266, filed on Jan. 31, 2020, provisional application No. 62/927,755, filed on Oct. 30, 2019.

(51) Int. Cl.
    *H04W 74/0816*   (2024.01)
    *H04W 80/02*   (2009.01)
    *H04B 7/0413*   (2017.01)

(52) U.S. Cl.
    CPC ....... *H04W 72/0446* (2013.01); *H04W 80/02* (2013.01); *H04B 7/0413* (2013.01)

(58) Field of Classification Search
    USPC .......................................................... 370/329
    See application file for complete search history.

(56) References Cited

U.S. PATENT DOCUMENTS

| | | |
|---|---|---|
| 11,576,208 B2 | 2/2023 | Seok et al. |
| 2005/0089001 A1 | 4/2005 | Nishikawa |
| 2005/0170776 A1 | 8/2005 | Siorpaes |
| 2008/0130622 A1 | 6/2008 | Hiertz et al. |
| 2009/0103501 A1 | 4/2009 | Farrag et al. |
| 2010/0075600 A1 | 3/2010 | Haartsen |
| 2012/0120892 A1 | 5/2012 | Freda et al. |
| 2012/0134342 A1 | 5/2012 | Le et al. |
| 2014/0233551 A1 | 8/2014 | Wentink et al. |
| 2014/0341100 A1* | 11/2014 | Sun ............................ H04L 1/08 370/311 |
| 2016/0330714 A1 | 11/2016 | Hedayat |
| 2016/0345202 A1 | 11/2016 | Bharadwaj et al. |
| 2017/0171878 A1 | 6/2017 | Chun et al. |
| 2017/0201975 A1* | 7/2017 | Yang ..................... H04L 69/324 |
| 2018/0084582 A1 | 3/2018 | Liu et al. |
| 2018/0199378 A1 | 7/2018 | Son et al. |
| 2018/0262984 A1 | 9/2018 | Huang et al. |
| 2018/0310330 A1 | 10/2018 | Chun et al. |
| 2019/0052428 A1* | 2/2019 | Chu ........................ H04W 8/005 |
| 2019/0195996 A1* | 6/2019 | Ding ................... H04W 64/006 |
| 2019/0297674 A1 | 9/2019 | Min et al. |
| 2019/0306920 A1 | 10/2019 | Son et al. |
| 2020/0214036 A1* | 7/2020 | Min .................. H04W 28/0278 |
| 2020/0288523 A1 | 9/2020 | Patil et al. |
| 2020/0383156 A1 | 12/2020 | Seok et al. |
| 2021/0368491 A1* | 11/2021 | Song ........................ H04L 1/18 |

\* cited by examiner

APPARATUS AND METHODS FOR TB PPDU ALIGNMENT FOR MULTI-LINK TRIGGERED UPLINK ACCESS IN A WIRELESS NETWORK

CROSS-REFERENCE TO RELATED APPLICATIONS

This application claims the benefit of and priority to co-pending U.S. patent application Ser. No. 17/082,762, with filing date Oct. 28, 2020, and provisional patent application Ser. No. 62/927,755, with filing date Oct. 30, 2019, and provisional patent application Ser. No. 62/968,266, with filing date Jan. 31, 2020, provisional patent application Ser. No. 62/992,228, with filing date Mar. 20, 2020, and provisional patent application Ser. No. 63/001,602, with filing date Mar. 30, 2020, and provisional patent application Ser. No. 63/013,586, with filing date Apr. 22, 2020, which are hereby incorporated by reference in their entirety.

FIELD

Embodiments of the present invention generally relate to the field of wireless communications. More specifically, embodiments of the present invention relate to systems and methods for triggered uplink access for a multi-link operation in a wireless network.

BACKGROUND

Modern electronic devices typically send and receive data with other electronic devices wirelessly using Wi-Fi, and many of these devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

However, in some cases, the use of a single band may not satisfy the bandwidth needs of certain devices. Therefore, some developing approaches to wireless communication increase communication bandwidth by operating on multiple bands concurrently (technically called link aggregation or multi-link operation).

When a wireless device sends and receives data simultaneously in a multi-link operation, in-device coexistence (IDC) interference can cause substantial performance loss between the multiple wireless links. The IDC interference caused by simultaneous transmission and reception over a 2.4 GHz band and 5 GHz band is typically negligible. However, the IDC interference caused by simultaneous transmission and reception over a 5 GHz band and 6 GHz band can substantially impact performance and lead to frequent packet loss.

Accordingly, for avoiding the IDC interference, a wireless device should not transmit and receive frames on multi-link simultaneously. However, because the wireless device cannot easily determine when the transmission of a frame will end, it is currently difficult to synchronize transmissions on multiple wireless links to ensure that the wireless device does not transmit and receive frames on multiple wireless links at the same time. Accordingly, multi-link operations are subject to IDC interference that can substantially impact performance do to overlapping (unaligned) frame transmissions over multiple wireless links.

Uplink transmission (UL) involving multiple non-access point (AP) station (STA)s transmitting simultaneously to an AP station is introduced in the IEEE 802.11ax standard called Triggered Uplink Access (TUA). This mechanism uses an 802.11 MAC frame called a Trigger Frame sent by the AP station. An HE-enabled AP station sends a trigger frame for initiating orthogonal frequency division multiple access (OFDMA) or multi-user multiple-input multiple-output (MU-MIMO) transmissions prior to the transmission of other non-AP stations. The trigger frame identifies non-AP stations participating in the UL MU transmissions and assigns resource units (RUs) to the non-AP stations. Each non-AP station receiving the trigger frame sends a trigger-based (TB) physical layer conformance procedure (PLCP) protocol data unit (PPDU) back to the AP using the RUs assigned to the respective station. Therefore, a method of performing constrained multi-link operation using triggered uplink access that prevents IDC interference caused by the transmission of a TB PPDU while a trigger frame is already being received on another wireless link of the non-AP STA is needed.

SUMMARY

Accordingly, embodiments of the present invention provide methods of TB uplink transmission for constrained multi-link operations that substantially prevent interference caused by the simultaneous transmission and reception of data (e.g., a PPDU) by a wireless device (e.g., a wireless STA or AP).

According to one embodiment, a method is disclosed that includes transmitting a frame from a first affiliated wireless access point (AP) of a multi-band wireless AP for receipt by a wireless station (STA), where the transmitting performed over a first wireless link, and the frame solicits a response frame, determining that a second affiliated wireless AP of the multi-band wireless AP is scheduled to transmit a trigger frame to the wireless STA over a second wireless link, the trigger frame includes a carrier sense (CS) required field having a predetermined value, and transmitting the trigger frame from the second affiliated wireless AP to the wireless STA over the second wireless link, where the response frame solicited by the frame is scheduled for transmission after the predetermined value has expired following an end of the physical layer conformance procedure (PLCP) protocol data units (PPDUs) containing the trigger frame.

According to some embodiments, the method includes determining that a difference between a starting time of a PPDU transmitted by the wireless STA in response to the first trigger frame and an ending time of a PPDU carrying the second trigger frame is equal to or greater than a period defined as: aSIFSTime+aSignalExtension−aRxTxTurnaroundTime.

According to some embodiments, the method includes including determining that a difference between a starting time of a PPDU transmitted by the wireless STA in response to the first trigger frame and an ending time of a PPDU carrying the second trigger frame is equal to or greater than 12 μs.

According to some embodiments, the wireless STA includes a non-simultaneous transmit and receive (NSTR) wireless STA.

According to some embodiments, the first wireless link includes a 6 GHz wireless link and the second wireless link includes a 5 GHz wireless link.

According to another embodiment, a method of data transmission in a wireless network is disclosed. The method includes receiving a first trigger frame and a second trigger frame from a wireless access point (AP) at a wireless station (STA) over a first wireless link and a second wireless link, respectively, where the first trigger frame and the second trigger frame solicit data frames that overlap, and transmitting a first data frame and a second data frame responsive to the first trigger frame and the second trigger frame over the first wireless link and the second wireless link, respectively, where at least a portion the first data frame and the second data frame overlap in time.

According to some embodiments, the method includes calculating a difference between an ending time of a first physical layer conformance procedure (PLCP) protocol data unit (PPDU) carrying the first trigger frame and an ending time of a second PPDU carrying the second trigger frame. The first data frame and the second data frame are transmitted when the difference between the ending time of the first PPDU and the ending time of the second PPDU is greater than a predetermined value, and the predetermines value includes at least one of: 4 µs; 8 µs; and 16 µs.

According to some embodiments, the first PPDU and the second PPDU are formatted using one of: a non-high throughput (HT); an HT; a very high throughput (VHT); and an extremely high throughput (EHT) format.

According to some embodiments, the method includes adjusting the ending time of the first PPDU by adjusting a MAC padding of the first PPDU.

According to some embodiments, the adjusting the ending time of the first PPDU substantially mitigates in-device coexistence interference.

According to some embodiments, the method includes adjusting the ending time of the first PPDU by adjusting a PHY padding of the first PPDU.

According to some embodiments, the method includes adjusting the ending time of the first PPDU by adjusting a packet extension (PE) frame of the first PPDU.

According to some embodiments, the method includes calculating a difference between an ending time of a first physical layer conformance procedure (PLCP) protocol data unit (PPDU) carrying the first trigger frame and an ending time of a second PPDU carrying the second trigger frame. The first data frame and the second data frame are transmitted when the difference between the ending time of the first PPDU and the ending time of the second PPDU is greater than a short interframe space (SIFS)−(10%×aSlotTime), and aSlotTime is determined according to a specification of the wireless network.

According to some embodiments, the first wireless link includes a 6 GHz wireless link and the second wireless link includes a 5 GHz wireless link.

According to some embodiments, the wireless STA is a non-simultaneous transmit and receive (NSTR) wireless STA.

According to another embodiment, a wireless communication device is disclosed, including a first transceiver and a second transceiver configured to send and receive data over the wireless network, and a processor operable to cause the first transceiver to transmit a first trigger frame for receipt by a wireless station (STA) over a first wireless link, where the first trigger frame includes a carrier sense (CS) required field having a predetermined value, determine that the second transceiver of the multi-band wireless AP is scheduled to transmit a second trigger frame to the wireless STA over a second wireless link, and cause the second transceiver to transmit the second trigger frame to the wireless STA over the second wireless link. The first trigger frame and the second trigger frame solicit physical layer conformance procedure (PLCP) protocol data units (PPDUs) that overlap in time.

According to some embodiments, the processor is further operable to determine that a difference between a starting time of a PPDU transmitted by the wireless STA in response to the frame and an ending time of the PPDU containing the trigger frame is equal to or greater than a period defined as: aSIFSTime+aSignalExtension−aRxTxTurnaroundTime.

According to some embodiments, the processor is further operable to determine that a difference between a starting time of a PPDU transmitted by the wireless STA in response to the trigger frame and an ending time of the PPDU containing the trigger frame is equal to or greater than 12 µs.

According to some embodiments, the wireless STA includes a non-simultaneous transmit and receive (NSTR) wireless STA.

According to some embodiments, the first wireless link includes a 6 GHz wireless link and the second wireless link includes a 5 GHz wireless link.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
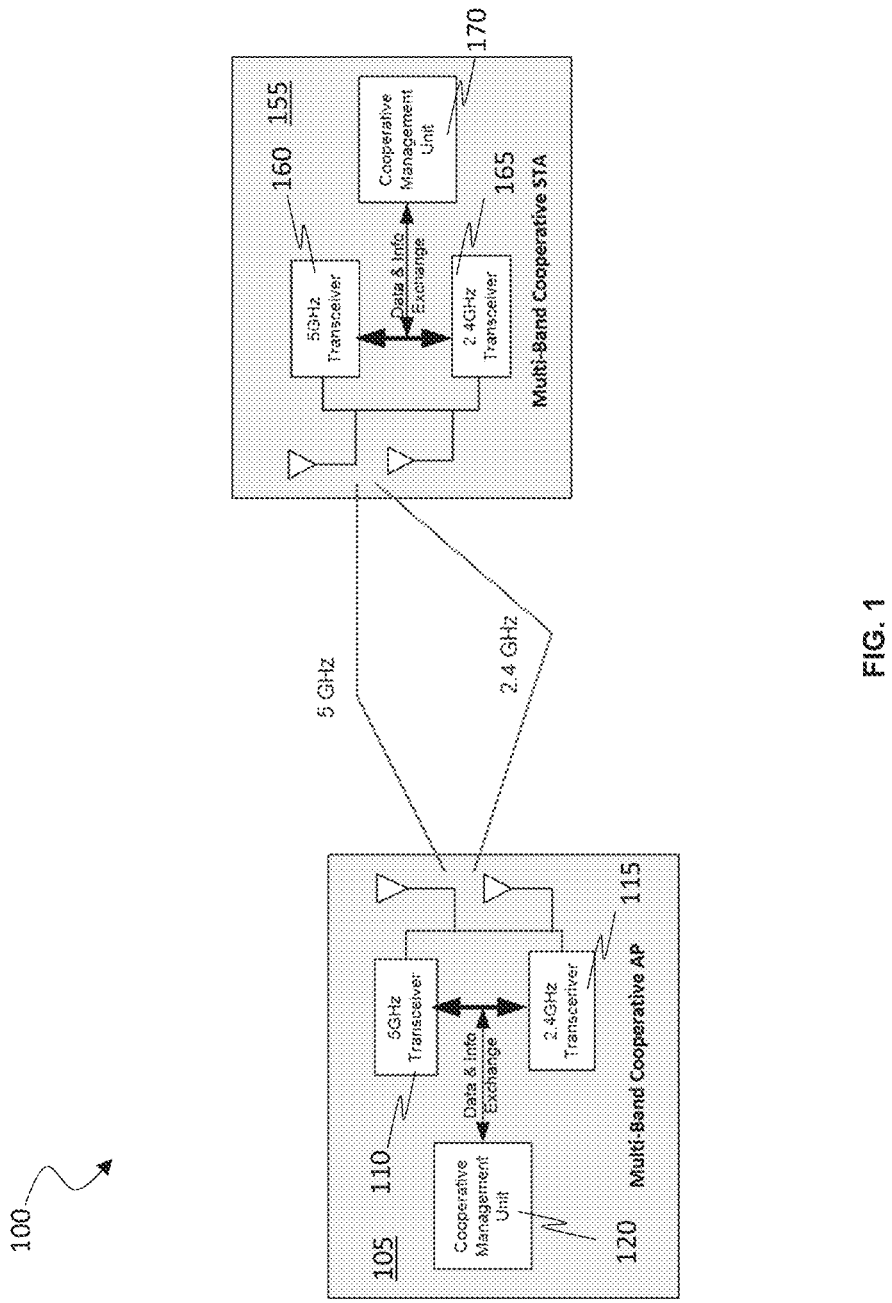
FIG. 1 is a block diagram of an exemplary synchronous multi-link transmission according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 8-10) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

SYNCHRONIZATION OF EHT MULTI-LINK

Triggered Uplink Access

As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Multi-link operations can provide higher network throughput and improved network flexibility compared to traditional techniques for wireless communication. Embodiments of the present invention substantially prevent interference caused by the simultaneous transmission and reception of data in a constrained multi-link operation of a wireless network. Multi-link operations can be performed between multi-link devices (MLDs) that include multiple affiliated STAs (non-AP STAs or AP-STAs) operating on different wireless links.

With regard to FIG. 1, an exemplary wireless communication system 100 including a multi-band cooperative AP 105 and a multi-band cooperative STA 155 are depicted according to embodiments of the present invention. The multi-band cooperative AP 105 and multi-band cooperative STA 155 are examples of MLDs. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115. The AP 105 can be considered to include two AP instances or "affiliated" APs for communicating using 5 GHz transceiver 110 and a 2.4 GHz transceiver 115.

The multi-band cooperative STA 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively, although any well-known wireless communication band (e.g., 6 GHz) can be used. The STA 155 can be considered to include two STA instances or "affiliated" STAs for communicating using 5 GHz transceiver 160 and a 2.4 GHz transceiver 165.

The multi-band cooperative AP 105 and the multi-band cooperative STA 155 have simultaneous transmission and reception capabilities for communicating using different wireless bands. The transmitters operating on the different bands can perform independent clear channel assessments (CCAs) using joint or intendent transmissions. Moreover, full duplex communication can be enabled by independent multi-band operation using FDD mode.

STA 155 transmitting frames using multiple bands simultaneously can mitigate delay and improve peak throughput of STA 155. However, in some cases, transmitting frames using multiple bands simultaneously can degrade the performance of the basic service set (BSS) comprising STA 155. Therefore, the AP 105 can control which STAs are granted multi-band channel access, and the access can be terminated by the AP at any time, for example, based on changing network conditions or requirements.

Depending on certain conditions, such as traffic load, a non-AP STA may use fewer than all supported/available links in order to reduce energy consumption. Moreover, a non-AP STA may apply an independent power management for each link, and the AP can provide the TID-to-link mapping information for each link. Depending the Quality of Service (QoS) policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide the TID-to-link mapping information for both links to the wireless STA, where some data can only be sent on the first link, and other data can only be sent on the second link.

Data transmitted over a first wireless link, such as the 5 GHz wireless link provided by 5 GHz transceiver 110 or 160, can be retransmitted over a different wireless link. For example, if a data transmission over the 5 GHz wireless link is sent unsuccessfully (e.g., no acknowledgment received), the data can be retransmitted over the 2.4 GHz wireless link provided by 2.4 GHz transceiver 115/165. The data can be retransmitted over the second link when an unscheduled channel switch to another channel occurs, or when transmitted a delay-sensitive packet over multiple links. Moreover, the data transmission (e.g., a PPDU) can be originally encoded for transmission on a first wireless link (e.g., a 2.4 GHz or 5 GHz wireless link), and the retransmitted data can be prepared for transmission according to embodiments of the present invention described herein for encrypting data for retransmission in a multi-link environment.

Figure 2:
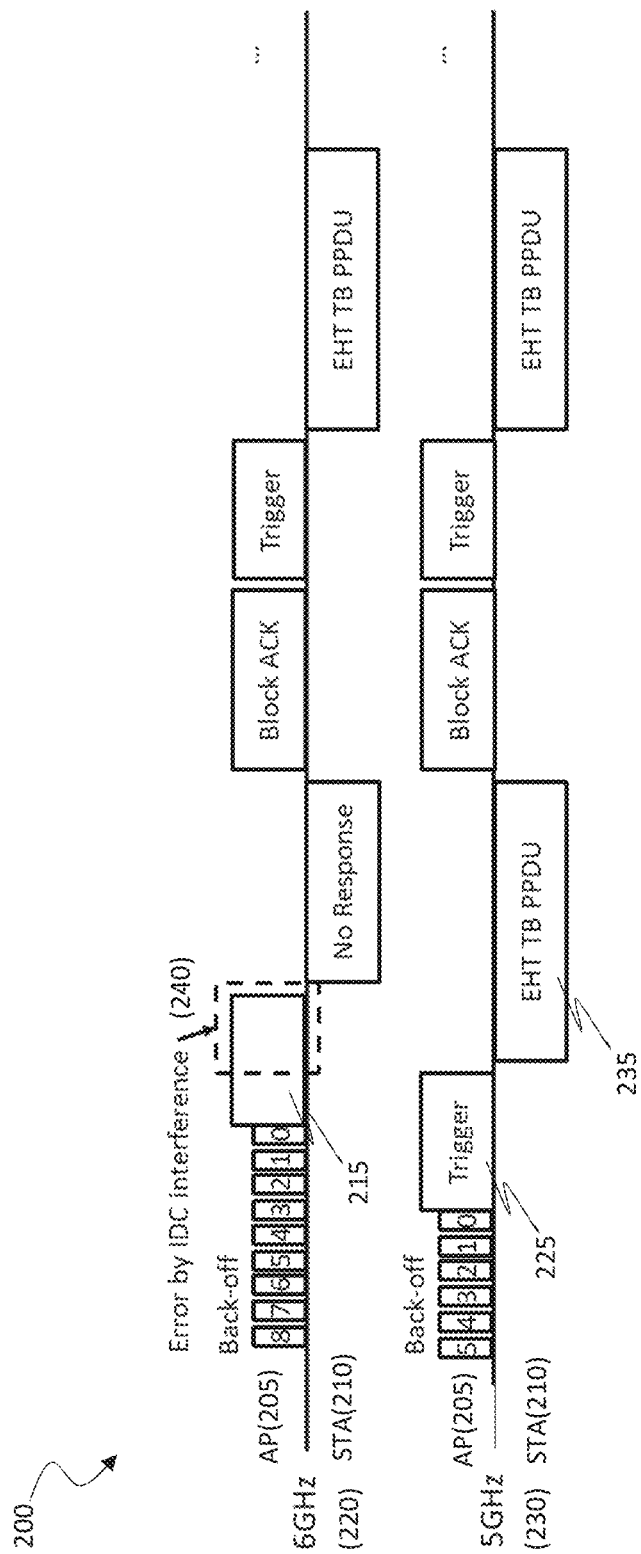
FIG. 2 is a block diagram depicting an exemplary constrained multi-link operation using triggered uplink access resulting in IDC interference caused by simultaneous transmission and reception of data by a wireless STA according to embodiments of the present invention.

FIG. 2 depicts an exemplary constrained multi-link operation 200 using triggered uplink access resulting in IDC interference caused by simultaneous transmission and reception of data by a wireless STA (e.g., a non-AP wireless STA or a multi-link device (MLD)) according to embodiments of the present invention. In FIG. 2, wireless AP 205 transmits trigger frame 215 to a wireless STA 210 soliciting an uplink response frame over a 5 GHz wireless link 220. AP 205 transmits trigger frame 225 to a wireless STA 210 soliciting an uplink response frame over a 6 GHz wireless link 230 before the transmission of trigger frame 215 to wireless STA 210 is complete. EHT TB PPDU 235 is transmitted by wireless STA 210 (responsive to trigger frame 215) before STA 210 has completed reception of trigger frame 225 resulting in IDC interference 240 caused by simultaneous transmission and reception of data in a multi-link operation. According to embodiments of the present invention, wireless APs are restricted from scheduling a PPDU carrying a trigger frame to an STA while the STA is transmitting an EHT TB PPDU responsive to a trigger frame on a separate wireless link within a prescribed margin to prevent IDC interference 240. In the example of FIG. 2, the multi-band AP 205 is a MLD including multiple affiliated APs (e.g., a first affiliated AP operating on 6 GHz link 220 and a second affiliated AP operating on 5 GHz link 230), and the multi-band STA 210 is a MLD including multiple affiliated STAs (e.g., a first affiliated STA operating on 6 GHz link 220 and a second affiliated STA operating on 5 GHz link 230).

Figure 3:
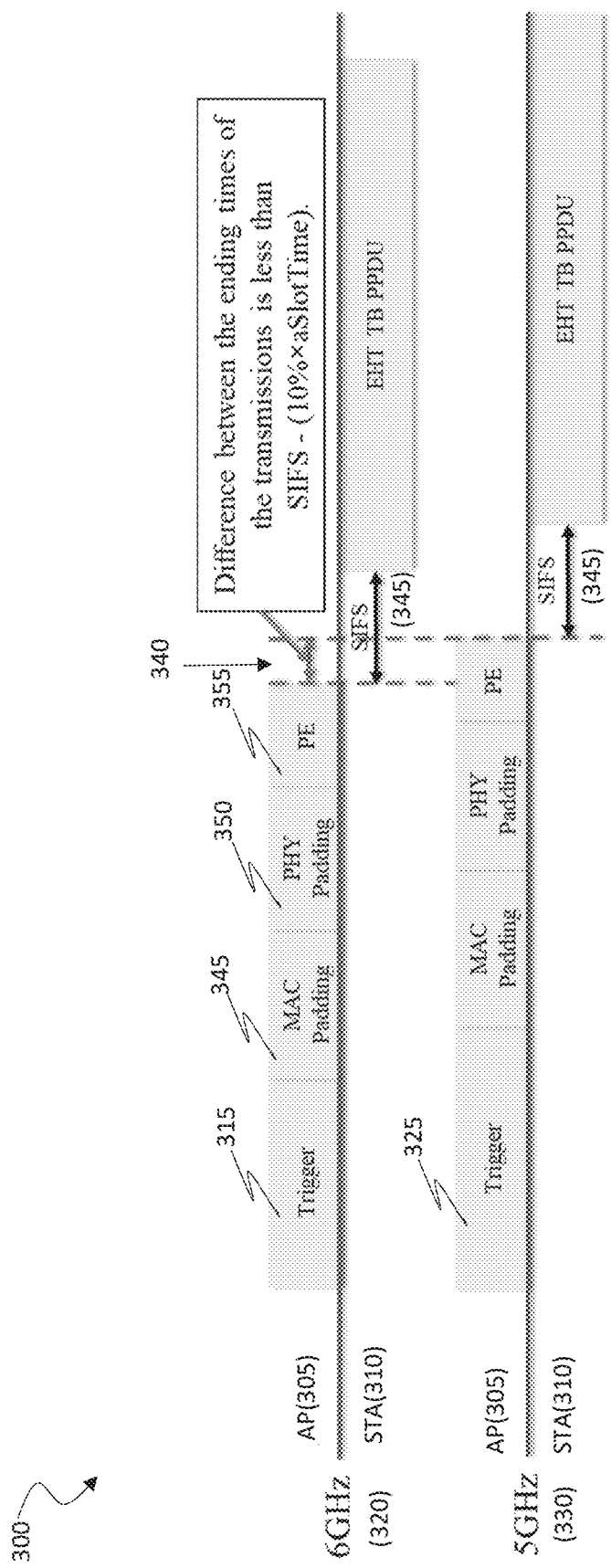
FIG. 3 is a block diagram of an exemplary constrained multi-link operation using triggered uplink access for preventing IDC interference caused by simultaneous transmission and reception of data by a wireless STA according to embodiments of the present invention.

FIG. 3 depicts an exemplary constrained multi-link operation 300 using triggered uplink access for preventing IDC interference caused by simultaneous transmission and reception of data by a multi-band wireless STA according to embodiments of the present invention. In FIG. 3, wireless multi-band AP 305 transmits trigger frame 315 to a multi-band wireless STA 310 soliciting an uplink response frame over a 5 GHz wireless link 320. AP 305 transmits trigger frame 325 to a wireless STA 310 soliciting an uplink response frame over a 6 GHz wireless link 330 before the transmission of trigger frame 315 to wireless STA 310 is complete. TB PPDU 335 is transmitted by wireless STA 310 (responsive to trigger frame 315) before STA 310 has completed reception of trigger frame 325 resulting in IDC interference. According the example of FIG. 3, wireless AP 305 can schedule a PPDU carrying a trigger frame to STA 310 when the difference between the ending times of the respective PPDU transmissions (e.g., trigger frames 315 and 325) is be less than the short interframe space (SIFS)−(10%× aSlotTime), where aSlotTime is a fixed/predefined value. As depicted in FIG. 3, because the minimum inter-frame space 340 is not less than SIFS 345, the transmission 315 and reception 335 by AP 305 advantageously do not overlap. The starting and ending time alignment in FIG. 3 can be achieved using MAC padding 345, PHY padding 350, and/or PE 355, for example. The SIFS time can be calculated as: SIFS=aSIFSTime+aSignalExtension. According to some embodiments, aSIFSTime is fixed at 10 μs at 5 GHz and 16 μs at 2.4, and the value of aSignalExtension is 0 μs for 5 GHz band and 6 μs for 2.4 GHz bands. The solicited PPDU can be sent in any well-known PPDU format, such as non-HT, HT, VHT, HE, EHT, etc.

According to one embodiment, the starting times and ending times of the multi-link transmissions are synchronized within a margin equal to SIFSTime+aSignalExtension using, for example, MAC padding, PHY padding, and/or packet extension (PE).

According to some embodiments, the margin is fixed at 16 μs. Specifically, the value of aSIFSTime is 10 μs for 2.4 GHz bands and 16 μs for 5 GHz bands, and the value of aSignalExtension is and 6 μs for 2.4 GHz bands and 0 μs for 5 GHz bands.

Figure 4:
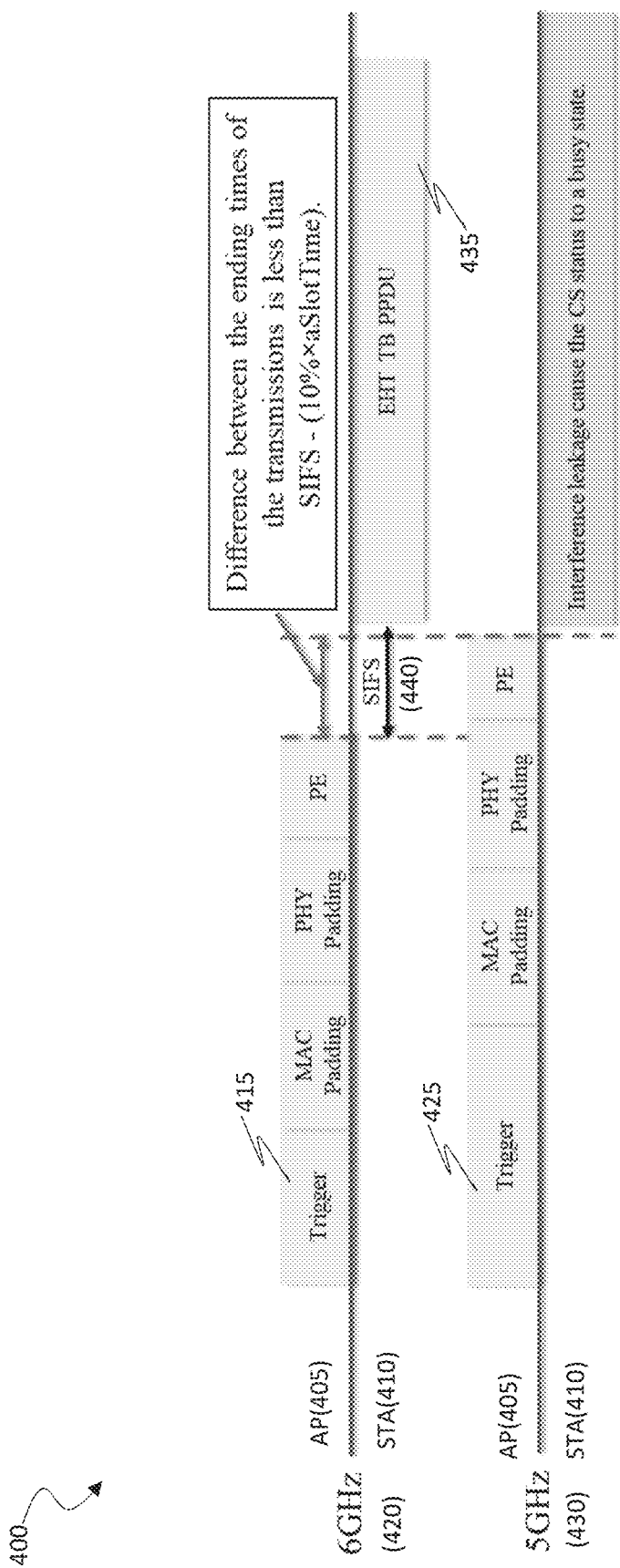
FIG. 4 is a block diagram of an exemplary constrained multi-link operation using triggered uplink access resulting in interference leakage caused by a wireless STA sensing a channel during a SIFS according to embodiments of the present invention.

With regard to FIG. 4, an exemplary constrained multi-link operation 400 for triggered uplink access resulting in interference leakage caused by a wireless STA sensing a channel during a SIFS is depicted according to embodiments of the present invention. In FIG. 4, wireless multi-band AP 405 transmits trigger frame 415 to a multi-band wireless STA 410 soliciting an uplink response frame over a 5 GHz wireless link 420 and trigger frame 425 over a 6 GHz wireless link 430. TB PPDU 435 is transmitted by wireless STA 410 (responsive to trigger frame 415) and the difference between the ending time of trigger frame 415 and the starting time of TB PPDU 435 is less than SIFS−(10%× aSlotTime). STA 410 senses the 6 GHz channel 430 during SIFS 440 which changes the carrier sense (CS) of the 5 GHz when the IDC interference is greater than the energy detection (ED) threshold. In this case, STA 410 will not respond to trigger frame 425 when the CS required field of trigger frame 425 is set to 1.

Figure 5:
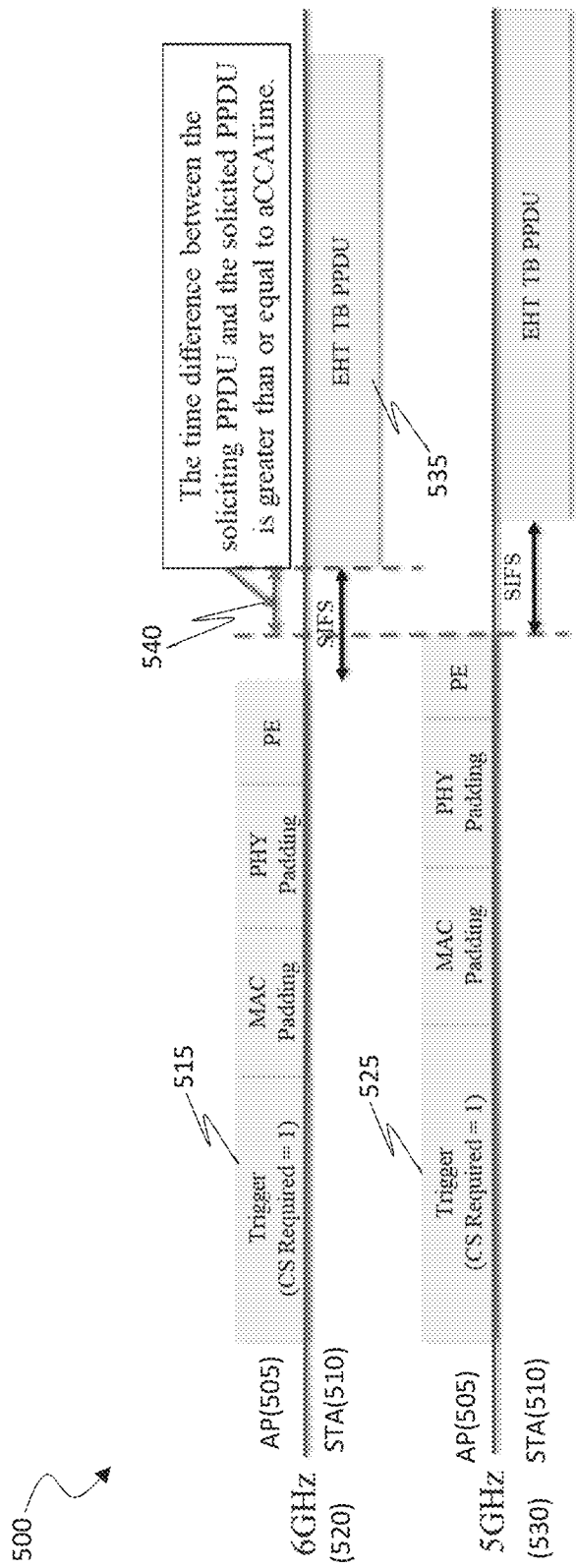
FIG. 5 is a block diagram of an exemplary constrained multi-link operation using triggered uplink access for preventing interference leakage caused by a wireless STA sensing a channel during a SIFS according to embodiments of the present invention.

With regard to FIG. 5, an exemplary constrained multi-link operation 500 using triggered uplink access for preventing interference leakage caused by a wireless STA sensing a channel during a SIFS is depicted according to embodiments of the present invention. In FIG. 5, wireless AP 505 transmits a trigger frame 515 to a wireless STA 510 soliciting an uplink response frame over a 5 GHz wireless link 520 and a trigger frame 525 over a 6 GHz wireless link 530. The TB PPDU 535 is transmitted by wireless STA 510 (responsive to trigger frame 515). The carrier sense (CS) required fields of the trigger frames 515 and 525 are set to 1. Accordingly, AP 505 determines if the difference 540 between the ending time of trigger frame 525 and the starting time of TB PPDU 535 is greater than or equal to the aCCATime prior to transmission. If the difference 540 is greater than or equal to the aCCATime, STA 510 can perform channel sensing during the SIFS and respond with a solicited TB PPDU 535 without causing interference. Otherwise, if the difference 540 between the ending time of trigger frame 525 and the starting time of TB PPDU 535 is less than the aCCATime, the transmission is restricted. According to some embodiments, the aCCATime is 4 μs or 8 μs. According to some embodiments, the aCCATime of a wireless STA is signaled by the wireless STA to the associated wireless AP.

According to some embodiments, a wireless STA does not respond to a trigger frame having a CS required field set to 1 if the TB PPDUs sent over different links are not exactly synchronized on OFDM symbol level. According to some embodiments, the STA reports any interference leakage from a first link that causes the CS status of a second link to switch to a busy state (when the interference is greater than the ED threshold). For concurrent TB PPDU transmission on the first link and the second link, the AP provides OFDM symbol alignment between the PPDU containing the trigger frame and the responsive TB PPDU. In other word, the ending times of PPDUs containing the trigger frames are aligned within the OFDM symbol duration (e.g., 4 us), and therefore the starting times of the responsive TB PPDUs are also aligned within the OFDM symbol duration (e.g., 4 us).

According to some embodiments, when a wireless AP cannot meet a synchronization requirement (e.g., the difference between ending times of PPDUs is less than SIFS−(10%×aSlotTime)), the wireless AP does not simultaneously trigger multiple TB PPDU transmissions that require CS. Accordingly, the wireless AP cannot simultaneously send more than one PPDUs containing a trigger frame with CS required set to 1. Nevertheless, the AP can simultaneously send more than one PPDU containing a trigger frame when one trigger frame includes a CS required field set to 1, and the other trigger frame includes a CS required field set to 0.

In some cases TB PPDUs sent on multi-link use different TXVECTOR parameters (e.g., GI or LTF type) making it difficult to synchronize the starting times and ending times of the transmissions on multiple links. To relax the requirements for multi-link operations, the starting times and ending times of the transmissions on multiple links can be synchronized within the margin of (aSIFSTime+aSignalExtension)/2 using MAC padding, PHY padding, or packet extension (PE) at the wireless STA. The transmission opportunity (TXOP) holder can adjust an inter-frame space (IFS) between the SIFS and the SIFS+SIFS/2 such that the IFS is different for each link. In these embodiments, the AP does not send a trigger frame having the CS required equal to 1 to the wireless STA on the second link if the wireless AP determines that the wireless STA may transmit a frame on the first wireless link during a SIFS after the soliciting trigger frame.

According to some embodiments, a wireless AP performing TB multi-link access is restricted from sending a Trigger frame with the CS Required subfield set to 1 to a wireless STA when a PPDU from an STA affiliated with the same wireless STA is scheduled for transmission within a predetermined margin after receiving the PPDU containing the Trigger frame. According to some embodiments, the margin is determined according to (aSIFSTime+aSignalExtention−aRxTxTurnaroundTime), and the aRxTxTurnaroundTime can equal 4 μs. For example, a wireless AP affiliated with a multi-band AP does not transmit a Trigger frame with the CS Required subfield set to 1 to an STA affiliated with a multi-band STA when a PPDU from another STA affiliated with the same multi-band STA is scheduled for transmission before a timer with a value of 12 μs (aSIFSTime+aSignalExtension−aRxTxTurnaroundTime, where aRxTxTurnaroundTime is equal to 4 μs) has expired. In this case the wireless AP and wireless STA follow CS Required rules defined according to the IEEE 802.11ax specification (e.g., 26.5.2 UL MU operation).

According to some embodiments, an AP can allocate traffic to a different link based on the QoS policy of a basic service set (BSS). For example, when frames belonging to traffic identifier (TID) 1 are allocated to link 1, and frames belonging to TID 2 are allocated to link 2, an HE TB PPDU sent on multi-links carries frames belonging to the QoS policy. For example, if the wireless AP allocates frames belonging to TID 1 to link 1, the HE TB PPDU sent over link 1 only carries frames belonging to TID 1. When MAC padding is used, the wireless STA can aggregate frames allocated to other links as determined by the wireless AP. The AP can indicate in the trigger frame whether a wireless STA can aggregate frames allocated to other links.

Figure 6:
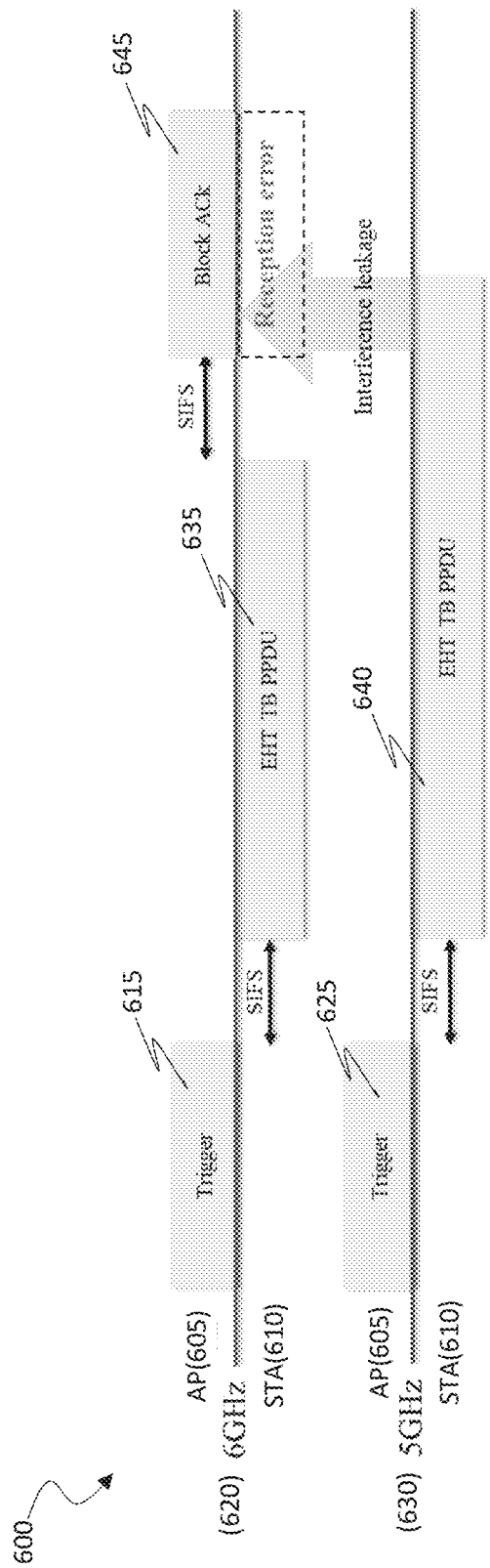
FIG. 6 is a block diagram of an exemplary constrained multi-link operation using triggered uplink access resulting in a reception error due to interference leakage between wireless links according to embodiments of the present invention.

With regard to FIG. 6, an exemplary constrained multi-link operation 600 using triggered uplink access resulting in a reception error due to interference leakage is between wireless links is depicted according to embodiments of the present invention. In FIG. 6, wireless AP 605 transmits trigger frame 615 to a wireless STA 610 soliciting an uplink response frame over a 6 GHz wireless link 620 and trigger frame 625 over a 6 GHz wireless link 630. EHT TB PPDU 635 is transmitted by wireless STA 610 responsive to trigger frame 615. The length of an EHT TB PPDUs (e.g., EHT TB PPDUs 635 and 640) is determined according to the respective trigger frame sent on the link associated with the EHT TB PPDU. In FIG. 6, the difference between the ending times of EHT TB PPDUs is greater than SIFS−(10%× aSlotTime) resulting in interference leakage, and the wireless STA fails to decode response frame 645.

Figure 7:
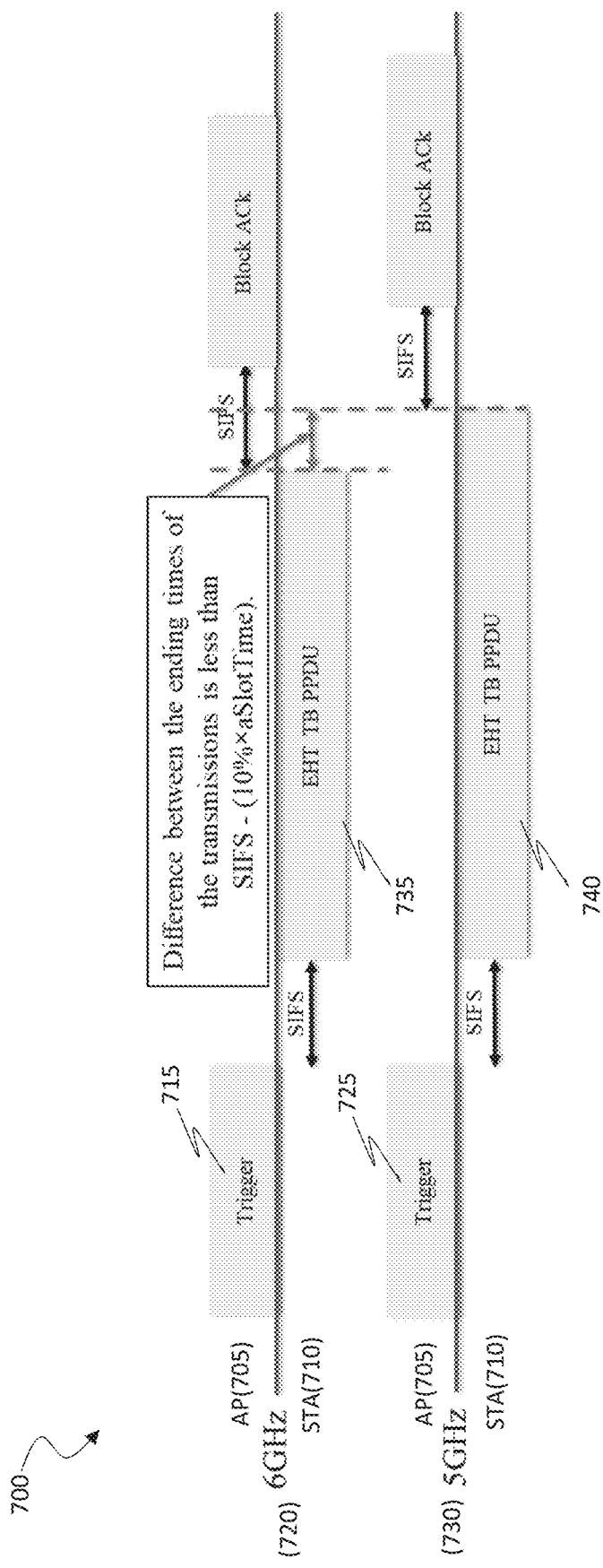
FIG. 7 is a block diagram of an exemplary constrained multi-link operation using triggered uplink access for preventing interference leakage according to embodiments of the present invention.

With regard to FIG. 7 an exemplary constrained multi-link operation 700 using triggered uplink access for preventing interference leakage is depicted according to embodiments of the present invention. In FIG. 7, wireless AP 705 transmits trigger frame 715 to a wireless STA 710 soliciting an uplink response frame over a 5 GHz wireless link 720, and transmits trigger frame 725 over a 6 GHz wireless link 730. TB PPDU 735 is transmitted by wireless STA 710 responsive to trigger frame 715 and TB PPDU 740 is transmitted by wireless STA 710 responsive to trigger frame 725. The UL Length subfield values in trigger frames 715 and 725 are set so that the difference between the ending times of TB PPDUs 735 and 740 is less than or equal to SIFS−(10%×aSlotTime). According to some embodiments, SIFS−(10%×aSlotTime) is a maximum bound for ending time alignment of the PPDUs, although of course tighter synchronization requirement can be applied (e.g., SIFS−(10%×aSlotTime)−aCCATime or 8 μs).

Figure 8:
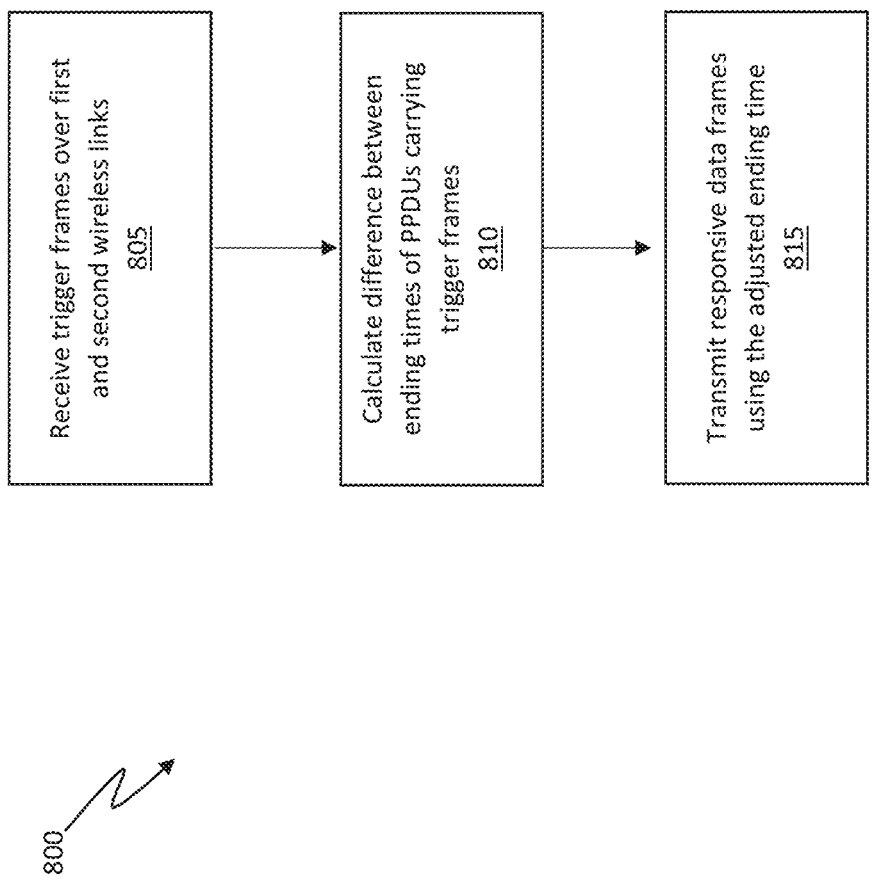
FIG. 8 is a flowchart depicting an exemplary sequence of computer-implemented steps for performing constrained multi-link triggered uplink access to prevent IDC interference according to embodiments of the present invention.

FIG. 8 is a flowchart 800 depicting an exemplary sequence of computer-implemented steps for performing constrained multi-link triggered uplink access to prevent IDC interference according to embodiments of the present invention.

At step 805, first and second trigger frames are received from a wireless access point (AP) at a wireless station (STA) over first and second wireless links, respectively.

At step 810, a difference between an ending time of the PPDU carrying the first trigger frame and an ending time of the PPDU carrying the second trigger frame is calculated.

At step 815, first and second data frames are transmitted in PPDUs responsive to the first and second trigger frames over the first and second wireless links, respectively, when the difference between the ending time of the PPDU carrying the first trigger frame and the ending time of the PPDU carrying the second trigger frame is less than the predetermined margin. According to some embodiments, the predetermined margin is calculated as: SIFS−(10%×aSlotTime). According to some embodiments, SIFS−(10%×aSlotTime) is a maximum bound for the ending time alignment of the PPDUs, although of course tighter synchronization requirement can be applied (e.g., SIFS−(10%×aSlotTime)−aCCATime or 8 μs). According to some embodiments, the ending time of the PPDUs is adjusted using MAC padding, PHY padding, and/or PE, for example.

Figure 9:
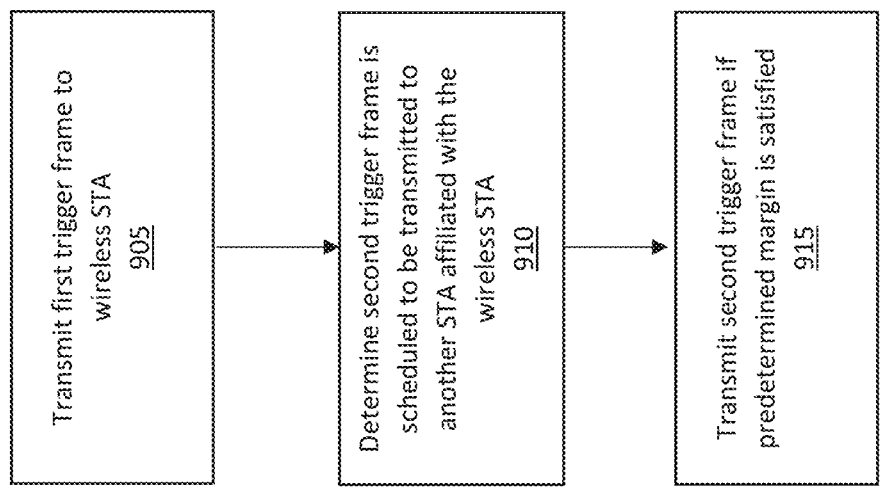
FIG. 9 is a flowchart depicting an exemplary sequence of computer-implemented steps for performing constrained multi-link triggered uplink access to prevent a wireless link from entering a busy state due to interference leakage according to embodiments of the present invention.

FIG. 9 is a flowchart 900 depicting an exemplary sequence of computer-implemented steps for performing constrained multi-link triggered uplink access to prevent a wireless link from entering a busy state due to interference leakage according to embodiments of the present invention.

At step 905, a first trigger frame is transmitted in a PPDU from a wireless access point (AP) to a wireless station (STA) over first wireless link, in a multi-link operation. The wireless AP and the wireless STA are MLDs that can communicate over multiple wireless links. The first trigger frame include a CS required fields having a value of 1 indicating that channel sensing is performed before transmission of a PPDU by a wireless STA transmitted in response to the trigger frame.

At step 910, the wireless AP determines that the AP is scheduled to transmit a second trigger frame in a PPDU over a second wireless link. The second trigger frame is sent by an AP instance affiliated with the wireless AP to an STA instance affiliated with the wireless STA.

At step 915, the second trigger frame is transmitted by the wireless AP (e.g., an AP affiliated with the wireless AP) when a difference between a starting time of a PPDU transmitted by the wireless STA in response to the first trigger frame and an ending time of the second trigger frame is greater than or equal to a predetermined margin. According to some embodiments, the predetermined margin is set according to an aCCATime defined by the wireless AP. For example, the aCCATime can be determined according to aSIFSTime+aSignalExtension−aRxTxTurnaroundTime, where aRxTxTurnaroundTime is equal to 4 μs. For example, the predetermined margin can be 12 μs. According to some embodiments, the ending time of the PPDUs is adjusted using MAC padding, PHY padding, and/or PE, for example.

Figure 10:
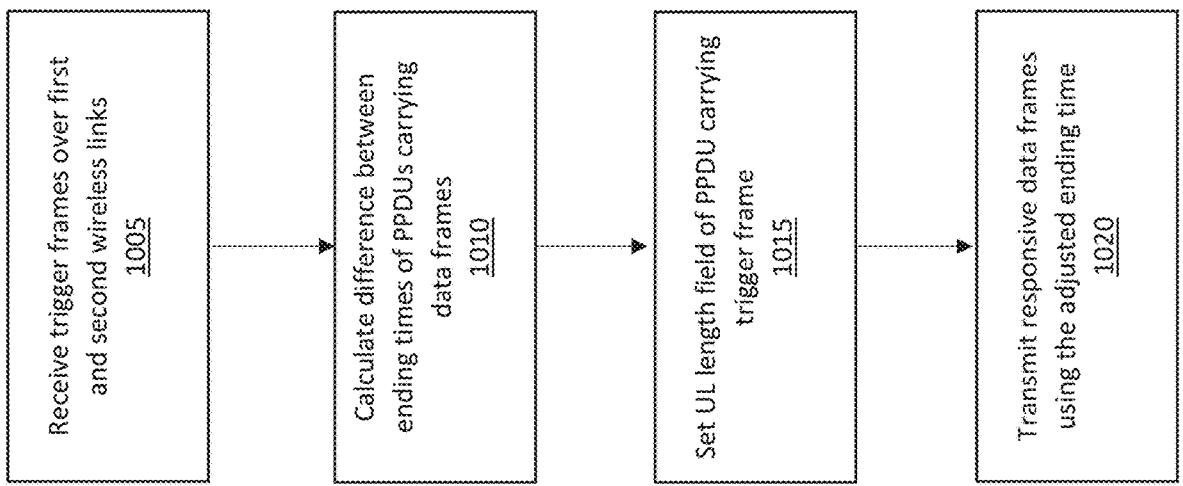
FIG. 10 is a flowchart depicting an exemplary sequence of computer-implemented steps for performing constrained multi-link triggered uplink access to prevent interference leakage between a wireless links according to embodiments of the present invention.

FIG. 10 is a flowchart 1000 depicting an exemplary sequence of computer-implemented steps for performing constrained multi-link triggered uplink access to prevent interference leakage between a first wireless link and a second wireless link. according to embodiments of the present invention.

At step 1005, first and second trigger frames are received from a wireless access point (AP) at a wireless station (STA) over first and second wireless links, respectively.

At step 1010, a difference between an ending time of the PPDU carrying the first data frame and an ending time of the PPDU carrying the second data frame is calculated.

At step 1015, a UL length field of the first and/or second PPDU is adjusted so that the difference between the ending times of the responsive PPDUs is less than or equal to SIFS−(10%×aSlotTime).

At step 1020, the first and second data frames are transmitted in PDDUs responsive to the first and second trigger frames over the first and second wireless links, respectively. The ending times of the data frames are substantially aligned within the predetermined margin to advantageously prevent channel leakage interference caused by the reception of a subsequent response frame (e.g., ACK or Block ACK) at the wireless STA. According to some embodiments, the ending time of the PPDUs is adjusted using MAC padding, PHY padding, and/or PE, for example.

At step 1025, the response frame is received responsive to the wireless AP receiving the first data frame and interference leakage is substantially prevented.

EXEMPLARY COMPUTER CONTROLLED SYSTEM

Embodiments of the present invention are drawn to electronic systems that perform multi-link operations in a wireless network. The multi-link operations can include constrained multi-link operations configured to prevent or mitigate IDC interference, for example, by aligning the starting/ending times of received/transmitted frames within a predetermined margin so that simultaneous transmission and reception is substantially prevented. The frame timing can be aligned using MAC padding, PHY padding, and/or packet extension (PE), for example. The following discussion describes one such exemplary electronic system or computer system that can be used as a platform for implementing embodiments of the present invention. The exemplary computer system 1112 can be a wireless access point or a wireless station, for example.

Figure 11:
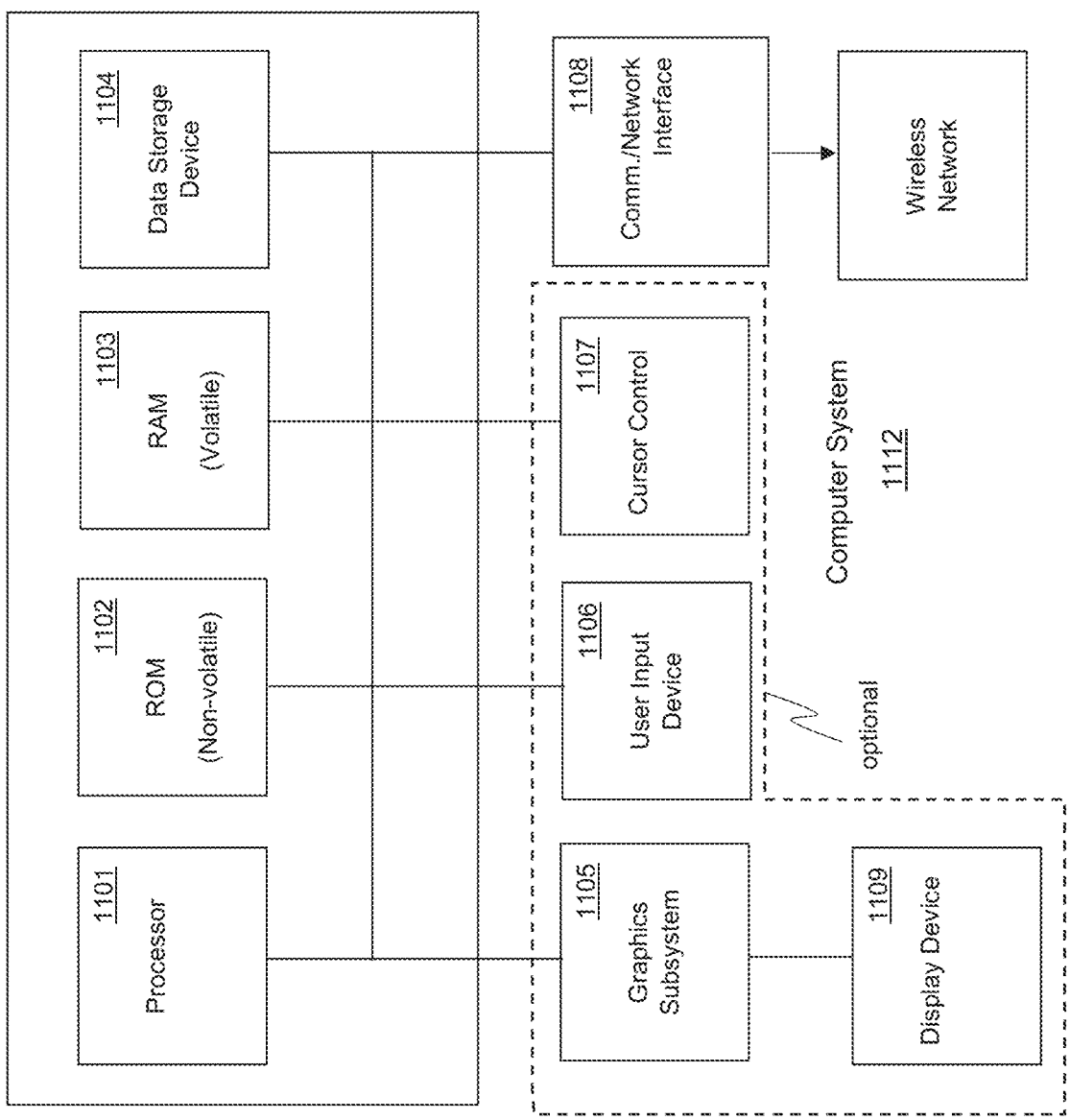
FIG. 11 is a block diagram depicting an exemplary computer system platform upon which embodiments of the present invention may be implemented.

In the example of FIG. 11, the exemplary computer system or wireless device includes a central processing unit (such as a processor or a CPU) 1101 for running software applications and optionally an operating system. Read-only memory 1102 and random access memory 1103 store applications and data for use by the CPU 1101. Data storage device 1104 provides non-volatile storage for applications and data and may include fixed disk drives, removable disk drives, flash memory devices, and CD-ROM, DVD-ROM or other optical storage devices. The optional user inputs 1106 and 1107 comprise devices that communicate inputs from one or more users to the computer system 1112 (e.g., mice, joysticks, cameras, touch screens, and/or microphones).

A communication or network interface 1108 includes a plurality of transceivers and allows the computer system 1112 to communicate with other computer systems, networks, or devices via an electronic communications network, including wired and/or wireless communication and including an Intranet or the Internet (e.g., 802.11 wireless standard). The network interface 1108 can perform multi-link operations (e.g., multi-link packet scheduling and channel access) using multiple wireless links to improve network throughput, for example. According to embodiments of the present invention, the communication or network interface 1108 can operate multiple transceivers simultaneously. The communication or network interface 1108 and can include a multi-band (e.g., dual-band) interface that can operate in multiple bands simultaneously, such as 2.4 GHz, 5 GHz, and/or 6 GHz.

The optional display device 1110 may be any device capable of displaying visual information in response to a signal from the computer system 1112 and may include a flat panel touch sensitive display, for example, and may be remotely disposed. The components of the computer system 1112, including the CPU 1101, memory 1102/1103, data storage 1104, user input devices 1106, and graphics subsystem 1105 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of data transmission in a wireless network, the method comprising:
    transmitting a frame from a first affiliated wireless access point (AP) of a multi-band wireless AP for receipt by a wireless station (STA), wherein the transmitting performed over a first wireless link, and the frame solicits a response frame;
    determining that a second affiliated wireless AP of the multi-band wireless AP is scheduled to transmit a trigger frame to the wireless STA over a second wireless link, the trigger frame comprising a carrier sense (CS) required field having a predetermined value; and
    transmitting the trigger frame from the second affiliated wireless AP for receipt by the wireless STA over the second wireless link, wherein the response frame solicited by the frame is scheduled for transmission after the predetermined value has expired following an end of a physical layer conformance procedure (PLCP) protocol data units (PPDUs) which contains the trigger frame.

2. The method as described in claim 1, further comprising determining that a difference between a starting time of a PPDU transmitted by the wireless STA in response to the frame and an ending time of the PPDU containing the trigger frame is equal to or greater than a period defined as: aSIFSTime+aSignalExtension−aRxTxTurnaroundTime.

3. The method as described in claim 1, further comprising determining that a difference between a starting time of a PPDU transmitted by the wireless STA in response to the trigger frame and an ending time of the PPDU containing the trigger frame is equal to or greater than 12 μs.

4. The method as described in claim 1, wherein the wireless STA comprises a non-simultaneous transmit and receive (NSTR) wireless STA.

5. The method of claim 1, wherein the first wireless link comprises a 6 GHz wireless link and the second wireless link comprises a 5 GHz wireless link.

6. A method of data transmission in a wireless network, the method comprising:
    receiving a first trigger frame and a second trigger frame from a wireless access point (AP) at a wireless station (STA) over a first wireless link and a second wireless link, respectively, wherein the first trigger frame and the second trigger frame solicit data frames that overlap;
    calculating a difference between an ending time of a first physical layer conformance procedure (PLCP) protocol data unit (PPDU) carrying the first trigger frame and an ending time of a second PPDU carrying the second trigger frame; and
    transmitting a first data frame and a second data frame responsive to the first trigger frame and the second trigger frame over the first wireless link and the second wireless link, respectively, wherein at least a portion the first data frame and the second data frame overlap in time, wherein the first data frame and the second data frame are transmitted when a difference between the ending time of the first PPDU and the ending time of the second PPDU is greater than a predetermined value.

7. The method of claim 6, wherein the predetermined value comprises at least one of: 4 μs; 8 μs; and 16 μs.

8. The method of claim 7, wherein the first PPDU and the second PPDU are formatted using one of: a non-high throughput (HT); an HT; a very high throughput (VHT); and an extremely high throughput (EHT) format.

9. The method of claim 7, further comprising adjusting the ending time of the first PPDU by adjusting a media access control (MAC) padding of the first PPDU.

10. The method of claim 9, wherein the adjusting the ending time of the first PPDU substantially mitigates in-device coexistence interference.

11. The method of claim 7, further comprising adjusting the ending time of the first PPDU by adjusting a PHY padding of the first PPDU.

12. The method of claim 7, further comprising adjusting the ending time of the first PPDU by adjusting a packet extension (PE) frame of the first PPDU.

13. The method of claim 6, further comprising calculating a difference between an ending time of a first physical layer conformance procedure (PLCP) protocol data unit (PPDU) carrying the first trigger frame and an ending time of a second PPDU carrying the second trigger frame, wherein the first data frame and the second data frame are transmitted when a difference between the ending time of the first PPDU and the ending time of the second PPDU is greater than a short interframe space (SIFS)− (10%×aSlotTime), and wherein aSlotTime is determined according to a specification of the wireless network.

14. The method of claim 6, wherein the first wireless link comprises a 6 GHz wireless link and the second wireless link comprises a 5 GHz wireless link.

15. The method of claim 6, wherein the wireless STA is a non-simultaneous transmit and receive (NSTR) wireless STA.

16. A wireless communication device comprising:
    a first transceiver and a second transceiver configured to send and receive data over the wireless network; and
    a processor operable to:
        cause the first transceiver to transmit a frame from a first affiliated wireless access point (AP) of a multi-band wireless AP for receipt by a wireless station (STA), wherein the transmitting performed over a first wireless link, and the frame solicits a response frame;

determine that a second affiliated wireless AP of the multi-band wireless AP is scheduled to transmit a trigger frame to the wireless STA over a second wireless link, the trigger frame comprising a carrier sense (CS) required field having a predetermined value; and cause the second transceiver the trigger frame from the second affiliated wireless AP for receipt by the wireless STA over the second wireless link, wherein the response frame solicited by the frame is scheduled for transmission after the predetermined value has expired following an end of a physical layer conformance procedure (PLCP) protocol data units (PPDUs) which contains the trigger frame.

17. The wireless communication device as described in claim 16, wherein the processor is further operable to determine that a difference between a starting time of a PPDU transmitted by the wireless STA in response to the trigger frame and an ending time of the PPDU containing the trigger frame is equal to or greater than a period defined as: aSIFSTime+aSignalExtension−aRxTxTurnaroundTime.

18. The wireless communication device as described in claim 16, wherein the processor is further operable to determine that a difference between a starting time of a PPDU transmitted by the wireless STA in response to the trigger frame and an ending time of the PPDU containing the trigger frame is equal to or greater than 12 µs.

19. The wireless communication device as described in claim 16, wherein the wireless STA comprises a non-simultaneous transmit and receive (NSTR) wireless STA.

20. The wireless communication device of claim 16, wherein the first wireless link comprises a 6 GHz wireless link and the second wireless link comprises a 5 GHz wireless link.

* * * * *